Dec. 28, 1926.
M. J. DUFFY
BALL BEARING TIRE
Filed Sept. 10, 1924
1,612,182
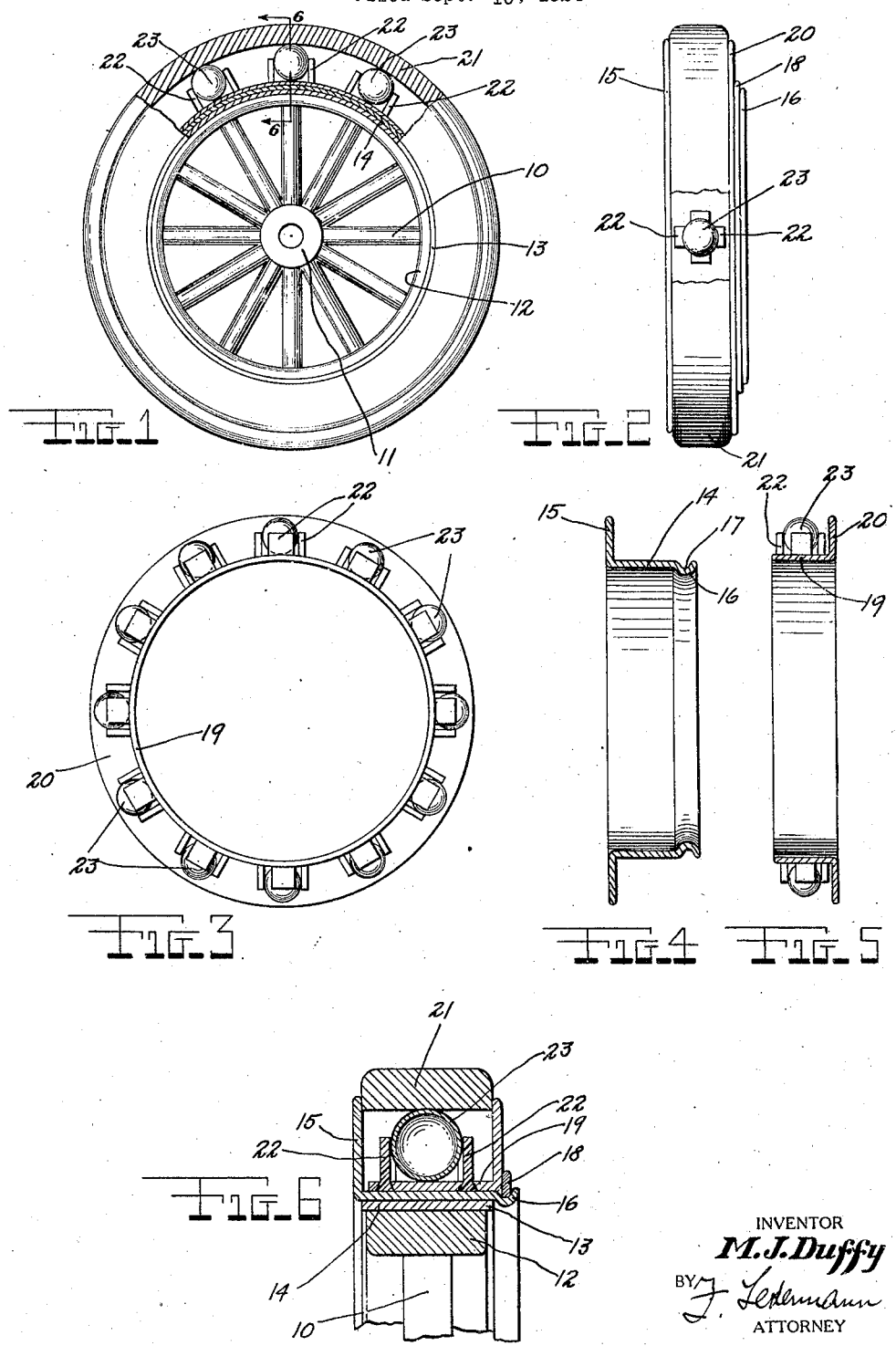
INVENTOR
*M. J. Duffy*
BY
ATTORNEY Patented Dec. 28, 1926.

1,612,182

UNITED STATES PATENT OFFICE.

MICHAEL J. DUFFY, OF BROOKLYN, NEW YORK.

BALL-BEARING TIRE.

Application filed September 10, 1924. Serial No. 736,831.

In the ordinary type of resilient wheel, springs or similar elements are used to give some buoyancy to the traction tire of the wheel. The springs when in use for a short period of time loose their tension with the result that the traction tire fits loosely or shakes on the wheel and the springs permit violent jars in passing over rough pavement. It is the main object of this invention to eliminate these disadvantages by employing a plurality of hermetically sealed flexible balls which are retained in place between the traction tire and the rim of the wheel and introduce a marked improvement in such construction inasmuch as the balls remain inflated for the entire length of their life.

Another object is to provide a resilient wheel having a traction tire supported by air filled balls which are retained in stationary position by resilient lugs, these lugs serving as additional means to aid in absorbing the severe jars encountered in passing over rough pavement or roadway.

These and other objects will become apparent in the description below, in which characters of reference refer to like-named parts in the drawing.

Referring briefly to the drawing, Figure 1 is a partially sectioned elevational view of the resilient wheel constructed in accordance with my invention.

Figure 2 is a side elevational view of the same, a portion of the traction tire being broken away to expose the interior construction.

Figure 3 is a front elevational view of one of the traction tire retainer rims, showing the means thereon for supporting said tire.

Figure 4 is a sectional elevational view of one of the tire retainer rims.

Figure 5 is a sectional elevational view of Figure 3.

Figure 6 is a cross sectional view taken on line 6—6 of Figure 1.

Referring in detail to the drawing, the numeral 10 indicates the spokes forming the main body of the wheel and which radiate from the hub 11. The ends of the spokes terminate and are secured to a felly 12 which is encircled by a band 13. On the annular band 13, an L-shaped felly is removably mounted. This felly consists of a rim section 14 having a flange or plate 15 radiating from one of its edges and the opposite edge 16 is deformed to provide a semi-circular channel 17 in which a sectional clincher ring 18 is removably mounted. An additional felly which serves as a tire retainer rim is also provided and its rim section 19 is of greater dimension circumferentially than the rim section 14, but its width is of lesser dimension than the latter. One edge of rim section 19 is also provided with a flange or plate 20 which serves as the opposite retaining wall to secure the traction tire 21 in place in the channel formed between the flanges 15 and 20 and the interengaged felly members. In the rim section 19, a plurality of slots are provided preferably in the region over each spoke and into these slots the ends of upstanding resilient lugs 22 are secured. These lugs are utilized in fours and are grouped to provide a square opening in which a hermetically sealed spherical ball 23 is mounted, it being noted that the height of the lugs is approximately half the diameter of the balls 23 so that the inner periphery of the traction tire 21 has a movement between the top of the lugs and the inner periphery of the traction tire in the normal position.

The operation of the wheel is as follows. Assuming that the wheel is rotating and supporting a load, the tire 21 causes the balls 23 to be distended in the direction parallel to the tangent of the wheel. As the load supporting the tire member is released from one of the balls, the latter immediately resumes its former spherical shape and again urges the tire into annular conformation at this position. When a tangential strain is applied to the periphery of the traction tire 21, it is necessary that the balls may be displaced tangentially on the rim section 19, that is, for a perfect working of the tire, the ball should roll a degree or a fraction of a degree to compensate for a similar movement of the traction tire. This is made possible thru making the lugs of a material having resiliency which when urged sidewise or bent, will readily give to this action and return to their normal position when the strain is removed. When it is desired to replace one or more of the balls 23 which may be subject to bursting or fracture, the clincher ring 18 is removed and both rim sections supporting the balls may be removed from the strap 14 of the opposite felly.

I claim:—

1. A device as described consisting of a wheel having a circumferential hollow rim, said hollow rim being closed by an annular tire tread, a series of resilient balls normally bridging said tread and the felly of the wheel, and extending circumferentially in said hollow rim, a plurality of spaced apart yieldable arms projecting radially into said hollow rim and positioning said balls out of contact with one another, said arms being out of contact with the tire tread.

2. The combination of a wheel, a circumferentially spaced apart series of hermetically sealed balls bearing upon the outer surface of said wheel, a plurality of resilient lugs projecting radially from the outer surface of said wheel and enclosing in spaced apart relation each ball, and a resilient tread operatively contacting all of said balls.

In testimony whereof I affix my signature.

MICHAEL J. DUFFY.